(12) United States Patent
Michelsen

(10) Patent No.: US 8,146,057 B1
(45) Date of Patent: Mar. 27, 2012

(54) INSTRUMENTATION SYSTEM AND METHOD FOR TESTING SOFTWARE

(75) Inventor: John Joseph Michelsen, Colleyville, TX (US)

(73) Assignee: Interactive TKO, Inc., Plano, TX (US)

( * ) Notice: Subject to any disclaimer, the term of this patent is extended or adjusted under 35 U.S.C. 154(b) by 1404 days.

(21) Appl. No.: 11/328,510

(22) Filed: Jan. 9, 2006

Related U.S. Application Data

(60) Provisional application No. 60/642,006, filed on Jan. 7, 2005.

(51) Int. Cl.
*G06F 9/44* (2006.01)

(52) U.S. Cl. .......... 717/124; 717/127

(58) Field of Classification Search .......... None
See application file for complete search history.

(56) References Cited

U.S. PATENT DOCUMENTS

| | | | |
|---|---|---|---|
| 5,450,586 A | 9/1995 | Kuzara et al. | 395/700 |
| 5,581,696 A * | 12/1996 | Kolawa et al. | 714/38 |
| 6,002,871 A | 12/1999 | Duggan et al. | 717/135 |
| 6,249,882 B1 | 6/2001 | Testardi | 714/38 |
| 6,473,707 B1 | 10/2002 | Grey | 702/123 |
| 6,601,020 B1 * | 7/2003 | Myers | 702/186 |
| 7,343,587 B2 * | 3/2008 | Moulden et al. | 717/124 |
| 7,721,265 B1 * | 5/2010 | Xu et al. | 717/127 |
| 2004/0025083 A1 * | 2/2004 | Nanja et al. | 714/35 |
| 2004/0068560 A1 * | 4/2004 | Oulu et al. | 709/224 |
| 2005/0097515 A1 * | 5/2005 | Ribling | 717/124 |
| 2006/0059169 A1 | 3/2006 | Armishev | 707/100 |
| 2006/0129992 A1 * | 6/2006 | Oberholtzer et al. | 717/124 |
| 2006/0206870 A1 * | 9/2006 | Moulden et al. | 717/124 |

OTHER PUBLICATIONS

LISA 2.0 User's Guide, Interactive TKO, Feb. 27, 2003.*
LISA 2.0 Developer's Guide, Interactive TKO, Mar. 13, 2003.*
Andrews et al., Tool support for randomized unit testing, Jul. 2006, pp. 36-45, <http://delivery.acm.org/10.1145/1150000/1145741/p36-andrews.pdf>.*
Saff et al., Automatic test factoring for java, Nov. 2005, pp. 114-123, <http://delivery.acm.org/10.1145/1110000/1101927/p114-saff.pdf>.*
Chang Liu, Platform-independent and tool-neutral test descriptions for automated software testing, Jun. 2000, <http://delivery.acm.org/10.1145/340000/337598/p713-liu.pdf>.*

* cited by examiner

*Primary Examiner* — Thuy Dao
(74) *Attorney, Agent, or Firm* — Patent Capital Group

(57) ABSTRACT

One or more test controls within code under test are enabled and then executing the code under test is executed. When enabled, the test control will interact with a tester when the code under test is executed (e.g., by providing data to the tester). The selection to enable the test control can be made based on whether the system accessing the code under test is a tester. If the system is a tester, the test control is enabled. Otherwise, the test control is disabled. The test control can include an execution control, a data definition control, and/or a log control.

20 Claims, 7 Drawing Sheets

```
<!-- Example of JSP tag library use of the Instrumentation API -->
<%@ taglib uri="lisa" prefix="lisa" %>
<lisa:integrator>
    <html>
    <title>Hello, world</title>
    <body>

<h2>Hello, world</h2>

<lisa:transaction id="hello world">
        <h3>Hello, world (in transaction)</h3>

<lisa:property name="foo" value="bar" />
        <lisa:property name="foo">bar</lisa:property>

<lisa:failTrans message="i failed!" />
        <lisa:failTrans>i failed!</lisa:failTrans>

<lisa:failTest message="i failed my test!" />
        <lisa:failTest>i failed my test!</lisa:failTest>

<lisa:log message="hello log" />
        <lisa:log>hello log</lisa:log>

<lisa:end message="the end" />
        <lisa:end>the end</lisa:end>

<lisa:nextNode nodeName="somenode" />
        <lisa:nextNode>somenode</lisa:nextNode>

<lisa:forceNode nodeName="node7" />
        <lisa:forceNode>node7</lisa:forceNode>
    </lisa:transaction>

<lisa:transaction id="trans-2">
        this content is from transaction #2
    </lisa:transaction>

</body>
    </html>
</lisa:integrator>
```

- 600 (top-left marker)
- 602, 604, 606, 608, 610, 612, 614 (braces on right)
- 616 (bottom-left marker)

FIG. 6

INSTRUMENTATION SYSTEM AND METHOD FOR TESTING SOFTWARE

This invention claims priority, under 35 U.S.C. §119 (e), to U.S. Provisional Application 60/642,006, entitled "Instrumentation of Software for Testability," which was filed on Jan. 7, 2005 and names John Joseph Michelsen as inventor. The above-referenced application is hereby incorporated by reference in its entirety as if completely and fully set forth herein.

FIELD OF THE INVENTION

This invention relates to testing and, more particularly, to testing software.

DESCRIPTION OF THE RELATED ART

Many software development teams first build an application and then attempt to test that application with off-the-shelf testing tools. Unfortunately, off-the-shelf testing tools often lack visibility into the application being tested. In other words, off-the-shelf testing tools are not able to easily verify any internal values that are not accessible via the user interface of the application being tested. This lack of visibility makes testing the system difficult, since certain values and/or activities cannot be verified directly.

As an example of a situation in which improved visibility into the application under test is desirable, consider the need to test a web site that provides customers with hotel reservations around the world. The web site needs to interact with a variety of external systems in order to obtain availability and rate information for each hotel. Additionally, the web site needs to perform relatively complex room rate and commission calculations. While the room rates are displayed to users of the web site, the commission calculations are internalized. When testing the hotel reservation web site, the tester may want to verify that the web site is retrieving the correct hotels for users. The tester may also want to verify that the commission amounts being calculated are accurate.

In this situation, testing the hotel reservation web site is complicated by the design of the web site. In order to provide a suitable user experience, for example, the web site may have been designed to not display error messages if there is a problem accessing one of the many external systems used to build the list of available hotels. As a result, if a failure occurs when accessing an external system, the web site will not show the results from that external system but will show results obtained from other external systems, thereby masking the fact that the results are not complete. While this provides a better user experience, it makes it difficult (or even impossible) for the off-the-shelf tester to test the web site's interactions with the external systems.

Another complication in testing arises if the web site has been designed to hide the commission amounts (e.g., by not delivering such amounts to a user's web browser). If the commission amounts are not output via the web site's user interface, the off-the-shelf testing system may be unable to verify the commission amounts. As these examples show, new techniques for testing software are desirable.

BRIEF DESCRIPTION OF THE DRAWINGS

A more complete understanding of the present invention may be acquired by referring to the following description and the accompanying drawings, in which like reference numbers indicate like features.

FIG. 6 shows an example of a Java Server Page (JSP) that has been instrumented for test, according to one embodiment of the present invention.

Figure 1:
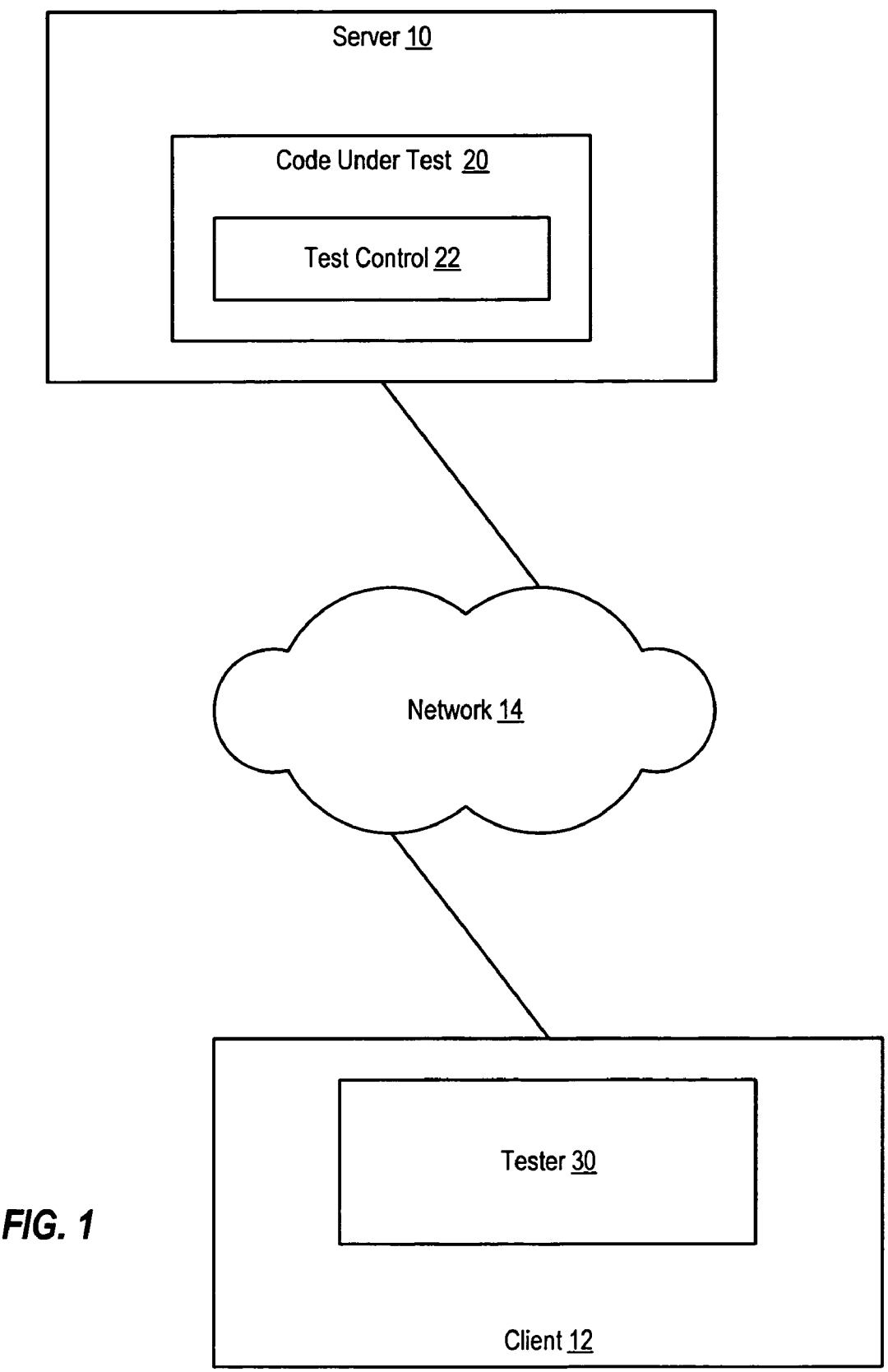
FIG. 1 is a block diagram of a testing system, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a block diagram of a testing system that includes a server 10 and a client 12, which are coupled by a network 14. Code under test 20 (e.g., an application to be tested) has been deployed on server 10. Code under test 20 includes one or more test controls such as test control 22. The client implements a tester 30.

Code under test 20 includes a set of executable instructions (e.g., an object, program, application, set of applications, or the like) that will be tested by tester 30. Code under test can be, for example, the code used to implement a web site. Accordingly, code under test 20 can include a web server as well as the hypertext markup language (HTML) and/or extensible markup language (XML) pages generated and/or served to clients by the web server. Other examples of types of code under test 20 include code used to provide web services and Java™ code.

The tester 30 is a testing tool that is configured to perform one or more tests on code under test 20. In some embodiments, tester 30 is an off-the-shelf testing tool (e.g., a software application available from a third-party vendor, as opposed to a testing tool that was completely designed in-house by the authors of code under test 20). For example, in one embodiment, tester 30 is LISA (Load-bearing Internet-based Simulator Application)™, available from iTKO, Inc. of Southlake, Tex. Tester 30 can be a functional test tool (e.g., a test tool that is designed to verify whether the code under test is functioning as intended), a performance test tool (e.g., to measure how the code under test performs under certain conditions), or a test tool that gathers significant metrics describing the operation of the code under test.

Test control 22 is a set of one or more instructions that are configured to interact with tester 30 during a test of code under test 20. Test control 22 can use an application programming interface (API) provided by tester 30 in order to communicate with tester 30. By communicating various internal data that is generated during execution of code under test 20 to the tester, test control 22 can provide tester 30 with increased visibility into code under test 20. It is noted that code under test 20 can include multiple test controls.

When executed during a test of code under test 20, test control 22 interacts with tester 30. In particular, test control 22 can capture and convey information to tester 30 and/or control the flow of the test (e.g., by passing or failing the test). Information captured by test control 22 can include information that would not otherwise be visible to tester 30. For example, if code under test 20 generates a value but never outputs that value via a user interface with which tester 30 interacts, tester 30 may not be able to directly verify that code under test 20 is generating the correct value. However, test control 22 can be configured to provide the value to tester 30, allowing tester 30 to verify that value.

There are several types of test controls that can be included in code under test 20. A "data definition" test control is configured to capture data that is stored, discovered, and/or calculated by code under test 20 and make that data available to tester 30, even when the user interface of code under test 20 (e.g., a web page) would not otherwise contain that data.

Another type of test control is a "log" test control. This type of test control is configured to capture logging messages that are generated when code under test 20 is tested and then provide those logging messages to tester 30. Conventional logging techniques simply store logging messages in a single location (e.g., a single log file) on the server, and thus it is difficult to subsequently determine which logging messages correspond to a particular test. In contrast, a log test control provides tester 30 with log messages generated during a particular test, as part of the performance of that test. In this manner, log messages can be isolated on a per-test and per-tester (if there are multiple testers) basis.

An "execution" test control is configured to control the performance of a test. For example, the programmer who is writing the code under test can insert execution test controls in order to cause a test to pass and/or fail if certain events occur during the test. Execution test controls can cause the test to pass or fail by sending the tester messages indicating that a success or failure has occurred (in some embodiments, these execution test controls can also control the flow of the tester by selecting the next test activity to be performed). Execution test controls can also control tests in other ways. For example, an execution test control can be configured to instruct the tester 30 to request additional input from a user before proceeding with the test.

If multiple test controls are included in code under test 20, some of the test controls can be somewhat interrelated (e.g., the test controls can act on the same data and/or in response to the same event). For example, a log test control can capture a particular logging message, while an execution test control can fail a test if that particular logging message is generated during the test.

Test control 22 is configured to only collect data and/or control the progress of execution when code under test 20 is interacting with an appropriate tester, such as tester 30. When code under test 20 is interacting with a non-tester user, test control 22 will not control execution progress or collect and provide data to the non-tester user. Thus, test control 22 is enabled when code under test 20 is interacting with tester 30 and disabled otherwise. Test control 22 is configured to identify whether a system that is attempting to access code under test 20 is a tester and to appropriately enable or disable its functionality based on whether the system is a tester. Since test control 22 is disabled in non-test situations, non-tester users will not have the extra visibility into code under test 20 provided by test control 22.

Server 10 and client 12 can each include one or more computing devices (e.g., personal computers, servers, personal digital assistants, cell phones, laptops, workstations, and the like). While the illustrated example shows tester 30 and code under test 20 as being implemented on different computing devices, other embodiments can implement both tester 30 and code under test 20 on the same computing device.

Figure 2:
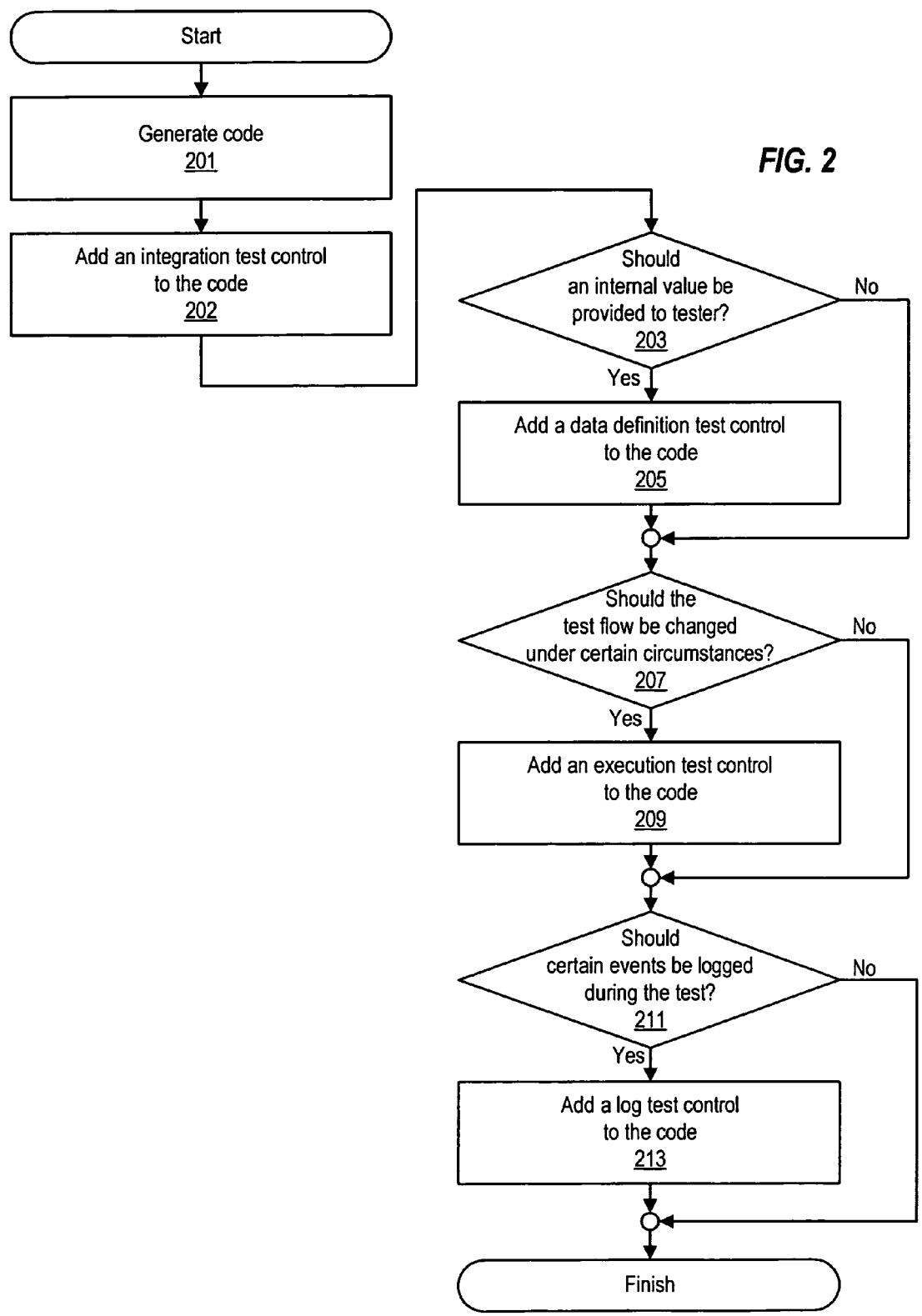
FIG. 2 is a flowchart of a method of instrumenting software for test, according to one embodiment of the present invention.

FIG. 2 is a flowchart of a method of instrumenting code for test. In order to provide the tester with visibility into the code, the code is "instrumented" by adding one or more test controls to the code. In some embodiments, the test controls are selectable from a library (e.g., provided by the vendor of the tester that will be used to test the code). This method can be performed by the author(s) of and/or user(s) that will test the code under test. Alternatively, parts of this method can be implemented by an automated process.

The method begins at 201, when the author(s) of the code under test actually generate the code. At various points during or subsequent to the code writing process, the author and/or user can decide to add test controls to the code.

As shown at 202, an integration test control is added to the code. The integration test control is configured to cause the system under test to determine whether a system accessing the code is a tester and, if so, to enable any other test controls present within the code. If the system accessing the code is not a tester, the integration test control will cause the system under test to disable any other test controls present within the code. An example of an integration test control is shown in FIG. 6.

If, as determined at 203, the author and/or user wants to provide an internal value to the tester, a data definition test control is inserted into the code, as shown at 205. A data definition test control is configured to collect a data value during a test and to then provide this data value to the tester. A data definition test control can be configured to collect data such as a property (i.e., a name and value pair), execution timing data, execution status data, and/or error data.

A data definition test control that is configured to collect a property will collect a value generated by the code under test and associate that value with a name. The data definition test control then returns the name and associated value to the tester. The tester stores the property (the name and associated value). For example, the tester can store the property in test run data associated with a particular execution of a particular test case. The tester can subsequently use the property as input to an assertion, as stimulus to another component under test, or to other test functionality, as desired.

A data definition test control that collects execution timing data can determine the amount of time taken to execute a particular portion of the code under test and generate a value representing that amount of time. The data definition test control then returns the value to the tester (the data definition test control can also generate and return a label identifying the value). Similarly, when the code under test is executed as part of a test, data definition test controls that collect execution status data and/or error data can collect error information such as error messages and/or exceptions and/or determine the execution status (e.g., pass, fail, indeterminate, and the like) of the code under test and then return the error information and/or execution status to the tester.

If, as determined at 207, it is desirable to change the flow of the test under certain circumstances, an execution test control can be added to the code, as shown at 209. The author and/or user can determine that if certain conditions occur, a test of the code should automatically pass or fail. In this situation, the author and/or user can insert an execution test control that is configured to detect the appropriate condition(s) and communicate the appropriate behavior (e.g., end the test in a "pass" state or end the test in a "fail" state) to the tester if the condition is detected. Similarly, if the execution path of the test should change under certain conditions, an appropriate execution test control can be added to the code under test. Other execution test controls can be configured to control the flow of the test in other ways, such as by causing a remote script to be executed under certain conditions. Typically, execution test controls will work by conveying instructions regarding how the test should proceed to the tester.

At 211, a determination is made as to whether certain events should be logged during the test. If so, a log test control can be added to the code, as shown at 213. The log test control is configured to capture one or more log messages and to communicate captured log messages to the tester.

It is noted that determinations 203, 207, and 211 can be repeated several times for the same set of code. Thus, multiple test controls of each type can be included in the code under test. It is also noted that certain types of test controls may not be included a given set of code. As mentioned briefly above, various different types of test controls can be provided in a library. A programmer or user can select test controls from the library for insertion into the code under test. The programmer or user can then modify the inserted test controls, if needed, to perform the desired function within the test. In one embodiment, the vendor supplying tester 30 provides, for example, Java or .NET APIs for communicating with tester 30 and Java Server Pages (JSP) tag libraries of test controls that can be inserted into the code under test. The test controls embedding within the code under test communicate with the tester via the vendor-specified API.

Figure 3:
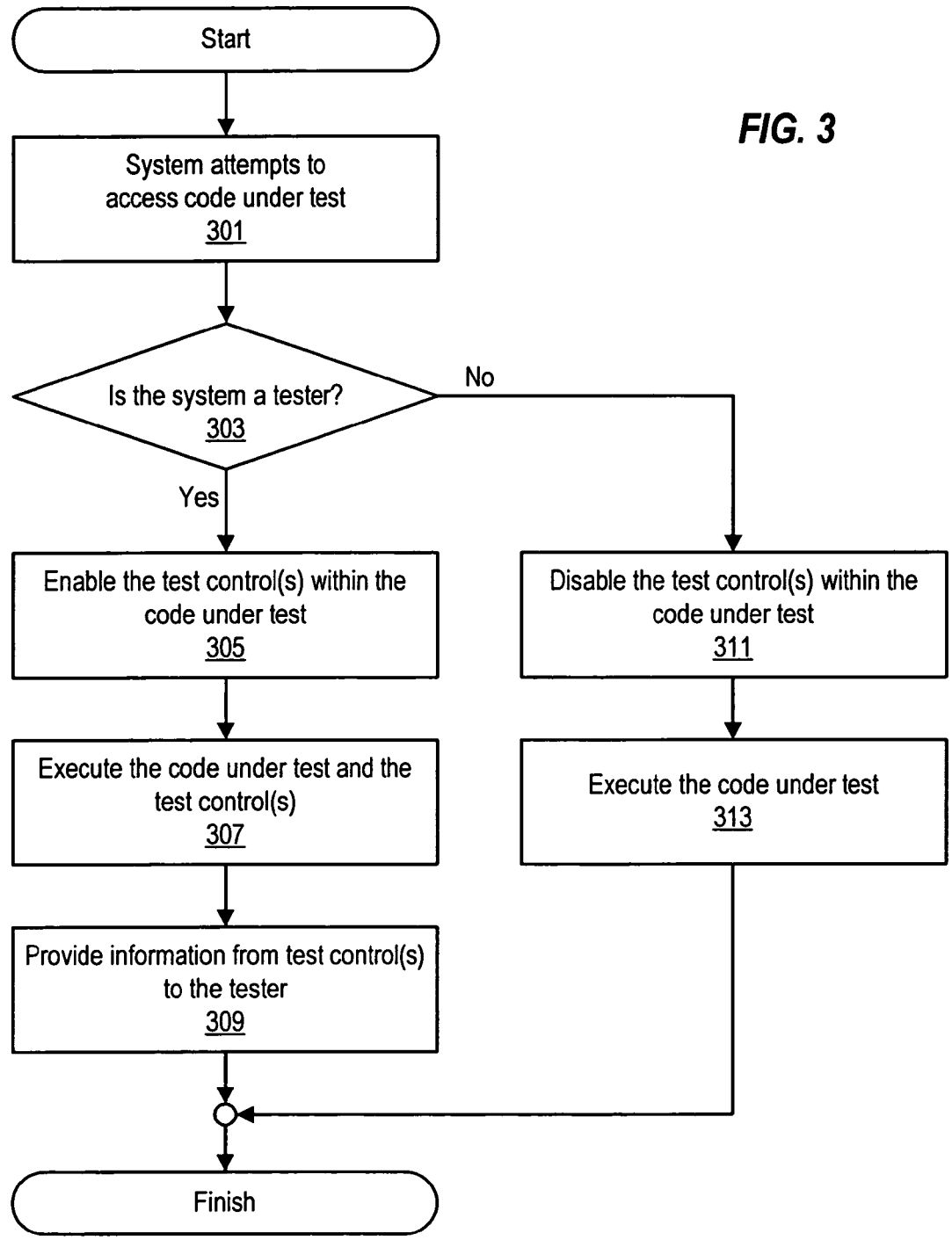
FIG. 3 is a flowchart of a method of executing instrumented software, according to one embodiment of the present invention.

FIG. 3 is a flowchart of a method of executing instrumented code. This method can be performed by the computing device that is executing the code under test and the test controls.

The method begins at 301, when a system attempts to access the code under test. This event can be detected, for example, when a Hypertext Transfer Protocol (HTTP) request for a web page (included in the code under test) is received from the system.

If the system that is attempting to access the code under test is a tester, as determined at 303, any test controls within the code under test are enabled, as shown at 305. If the system is not a tester, the test controls are disabled and the code under test is executed without also executing the test controls, as shown at 311 and 313. Accordingly, the instrumentation logic inserted into the code under test (e.g., according to a method such as the one shown in FIG. 2) is executed only if the code under test is being executed by a testing system.

Determination 303 can be made based on information included in, for example, a request to access the code under test. When web sites are being tested, for example, the tester can be configured to add a custom HTTP header to every request. The custom HTTP header is unique to the tester (e.g., a value in this header can be selected by a user of the test system). If this custom HTTP header is included in a received request, the test controls within the code under test will be enabled.

The code under test, including the enabled test control(s) is then executed, as shown at 307. The enabled test control(s) will operate to collect data and/or to control the progress of the test during execution. If any of the test controls included in the code under test are configured to return data to the tester, this data will be provided to the tester, as shown at 309. This data is formatted in a manner that is consistent with the API provided by the tester.

Operation 309 can be performed in a variety of different ways, depending on the type of code being tested. For web-based applications, the test control(s) place a comment (e.g., a tag that begins with "<!" and end with ">") in the resulting HTML. This comment includes the data being returned to the tester by the test controls embedded in the code under test. In some embodiments, the data can first be encoded (e.g., as an ASCII string) before being inserted into the comment. For Java™ or .NET-based code under test, the test controls can provide a particular programming interface and/or object or method in the data returned to the tester.

The tester can then process the data provided at 309. Each piece of data that is returned to the tester (at 309) can subsequently be added to the state of the tester. For example, the tester can add each piece of data to a test case (a set of instructions and data describing how to perform a test of the code under test) and/or a test run (a set of instructions and data that includes a test case and a description of how the code actually performed when tested according to the test case). The tester can maintain a log (e.g., as part of a test run) in which returned log messages and/or error messages can be stored. Examples of the different pieces of data that can be returned to the tester include properties (name/value pairs) (e.g., as generated by data definition test controls) that can subsequently be used as state information (e.g., by adding those properties to a test case) by the tester. Other types of pieces of data include status information, such as messages generated by execution test controls to indicate the success or failure of all and/or parts of the code under test being executed. Such status information could, in some embodiments, include a status code (e.g., abbreviations used to indicate status conditions such as "pass" or "fail") and an optional message associated with that code.

Any log messages provided at 309 (e.g., as provided by a log test control) are stored in the tester's execution log. When storing the log messages, the tester can associate the log messages with the actual request and response delivered by the code under test during the test in which the log messages were generated. Any test control commands (e.g., such as status codes generated by an execution test control) that are provided by the code under test can be processed. A failure status code, for example, could cause the tester to fail the associated transaction in a test case. Particular status codes can also affect the progress of a test case (e.g., the tester can select to execute different test functions based on whether certain status codes are received).

Returning to the hotel reservation system described in the background section, the improved visibility that can be provided by instrumenting the code under test can appreciated. While the conventional system could not easily verify internal values, such as the commission amounts, the instrumented code under test described herein can be configured to return these commission amounts to the test system (e.g., using data definition test controls). Similarly, while the conventional system could not easily test whether the external systems used by the hotel reservation system were operating properly, the instrumented test code described herein can be configured to return appropriate status and/or error information to the tester in order to inform the tester as to whether the external systems are operating properly. At the same time, since the data collected by the test controls is not provided to non-test users, a desired user experience and/or level of security can be maintained.

As another example, in conventional systems, log messages generated during a test may be stored in a single log file on the computing device executing the code under test. Such log messages are difficult to reconcile with actual test instances. To improve visibility, instrumented code under test can be configured (e.g., using a log test control) to return log messages to the tester, allowing the tester to reconcile the received log messages with actual test instances.

Figure 4:
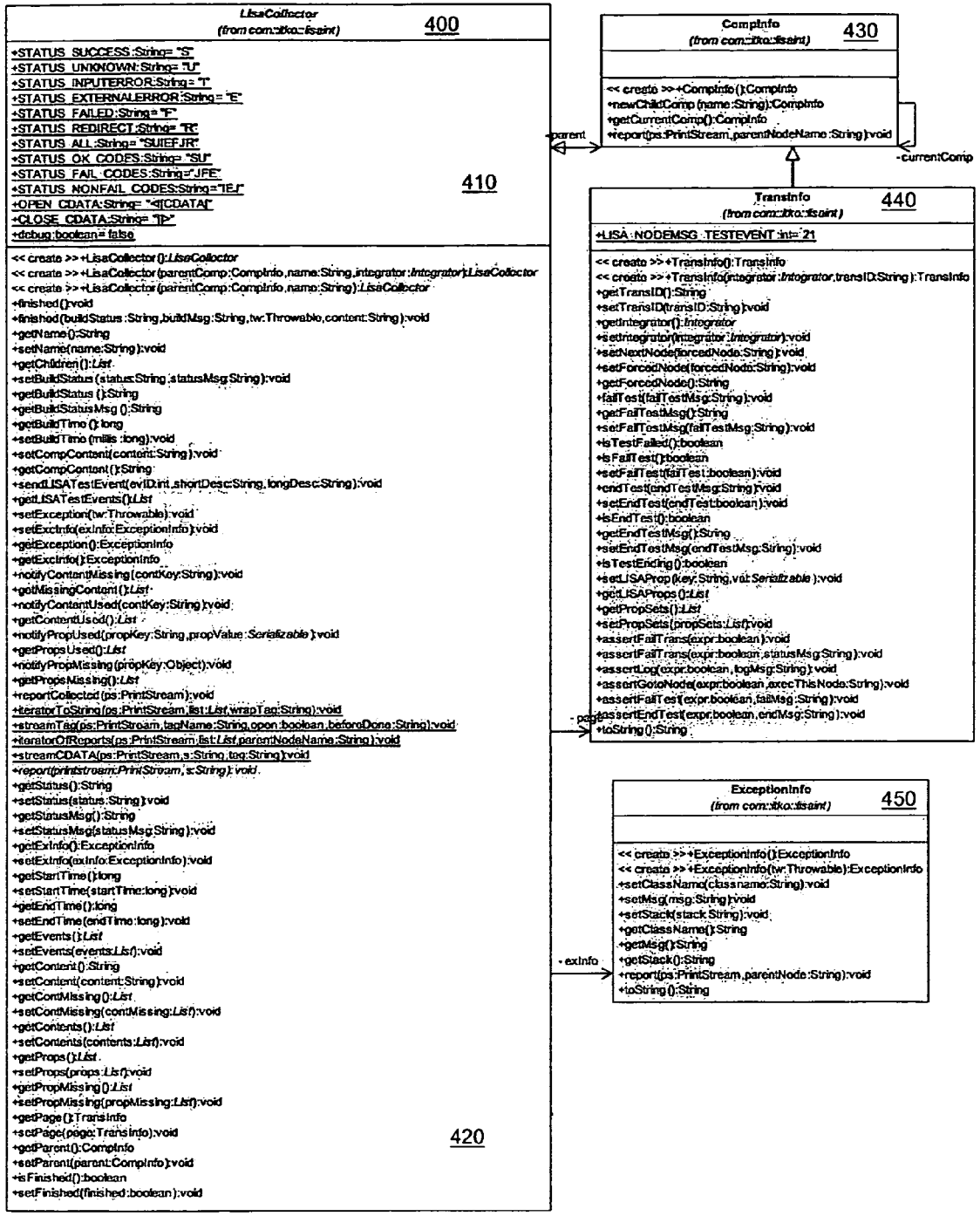
FIG. 4 illustrates example instrumentation classes that can be used when testing instrumented software, according to one embodiment of the present invention.

FIG. 4 illustrates example instrumentation classes that can be used when testing instrumented code. These classes can be included within the tester that will be used to test the instrumented code. The instrumentation classes in FIG. 4 form a data collection (or data object) model that is populated automatically and/or by the programmer as he or she uses the available calls. It is noted that other instrumentation logic can be used instead of and/or in addition to the example classes shown in FIG. 4.

LisaCollector 400 is a class that defines (as shown at 410) various status codes that may be returned by the instrumented code under test. LisaCollector 400 also includes various methods 420 that are used to handle data returned to the tester by the instrumented code. For example, the setBuildStatus method allows a user to specify information (e.g., such as information that will be returned by a data definition test control) that the tester can use when determining how to run the test.

CompInfo 430 is a class that includes methods that are used to separate a transaction into multiple sub-components in order to provide increased testing granularity (this allows data returned by a test control to be associated with a particular sub-component of a transaction, based on when that data is captured and/or returned by the test control). TransInfo 440 includes methods that are used to handle returned information (e.g., generated by an execution test control) that indicates testing events, such as test failure and success, during a particular transaction. This information can include the information generated during various sub-components of that transaction.

Examples of methods that can be provided by the TransInfo 440 class include the following methods. The assertLog(expr: boolean, logMsg: String) method will cause the String logMsg to be written to a log if the assertion expr is false. The method assertEndTest(expr:boolean, endMsg:String) will cause the tester to end the test normally and to write the String endMsg to the log if the assertion expr is false. The assertFailTest(expr:boolean, failMsg:String) method will cause the tester to fail the test and write the String failMsg to the log if the assertion expr is false. If the assertion expr is false, assertFailTrans(expr:boolean, statusMsg:String) will cause the tester to consider the transaction failed and write the String statusMsg to the log. If assertion expr is false, assertGotoNode(expr:boolean, execThisNode:String) will cause the tester to execute the test functionality represented by the node specified by the String execThisNode next. The method setForcedNode overrides the next node as determined by the test case.

ExceptionInfo 450 includes methods that are used to handle returned information (e.g., generated by a data definition test control) identifying exceptions or other error conditions. In conventional tester systems, the occurrence of exceptions within the code under test is often hidden from the tester. Accordingly, this system's ability to capture exceptions (e.g., using a data definition test control) through instrumentation provides additional visibility into the code under test. An exception captured by a data definition test control and handled by tester functionality (such as that provided by ExceptionInfo 450) can include various information, such as a type or kind description (e.g., as in a "File Not Found" exception), a description (e.g., "file c:\doesnotexist.txt was not available"), and a stack trace, which is the location within the source code where the exception was discovered (or "thrown").

Figure 5:
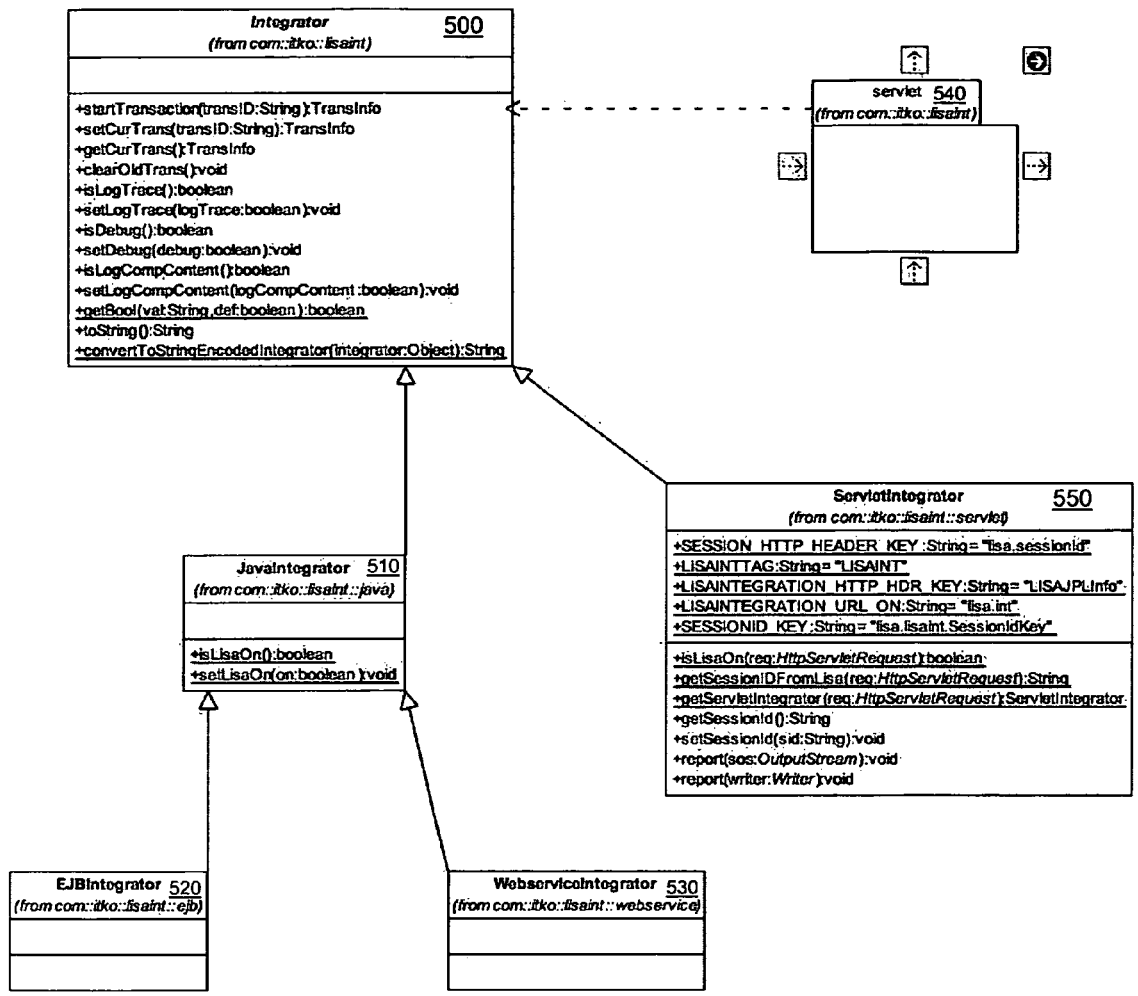
FIG. 5 illustrates how Java™ test controls access the core collection classes shown in FIG. 4, according to one embodiment of the present invention.

FIG. 5 illustrates how Java™ programs access the tester. In FIG. 5, a servlet (the code under test in this example) can access an integrator. An integrator is an application-specific class, derived from abstract class 500, that coordinates communication with the tester. For example, EJBIntegrator 520 class is configured to inform an Enterprise Java Bean (EJB) component whether or not the EJB component is communicating with a tester. If the EJB component is communicating with a tester, the EJBIntegrator starts a transaction and gives the EJB component access to an object that is used to return collected data to the tester.

Several different types of integrators are derived from base integrator 500, including JavaIntegrator 510, EJBIntegrator 520, WebserviceIntegrator 530, and ServletIntegrator 550. In this example, the servlet will access the ServletIntegrator 550, since that integrator is specifically configured for use with servlets. ServletIntegrator 550 includes methods that are useable to interact with the tester and to return data collected by test controls within the servlet to the tester.

As an example, when web-based applications are tested, a streamed version of the appropriate integrator object can be embedded into the HTML output of the web server. The ServletIntegrator object can be encoded and then embedded in an HTML comment within the HTML output, as described above. The ServletIntegrator class provides a method, report, that takes the data collected by the test controls and performs the embedding described above before returning the HTML output to the tester.

FIG. 6 shows an example of JSP code that has been instrumented for test. In the example of FIG. 6, a integration test control "<lisa:integrator>" 600 has been included before the HTML header. When the web server detects the integration test control within a JSP page, the web server will check the corresponding HTTP request for a special header that is unique to the tester. If this header is present, the web server will enable the other test controls within the JSP page. Otherwise, the web server will disable any other test controls within the JSP page.

The JSP page includes two transactions, "hello world" and "trans-2." The "hello world" transaction includes data definition test control 602, execution test controls 604 and 606, log test control 608, and execution test controls 610, 612, and 614.

Data definition test control 602 defines the property named "foo" to have a value of "bar." Execution test control 604 generates a failure status code if the "hello world" transaction fails and associates the message "i failed!" with this failure status code. Execution test control 606 generates a failure status code "failTest" if a failure is detected and associates the failure status code with the message "i failed my test!".

Log test control 608 captures a log message "hello log." Execution test control 610 is configured to cause the test to end and to generate an associated message "the end." Execution test controls 612 and 614 are each configured to select the next node (e.g., test functionality) to be executed by the tester. Execution test control 612 selects the node "somenode" while execution test control 614 selects the node "node7."

When the end of the integration test control "</lisa:integrator> is encountered by the web server, the web server will encode (e.g., as ASCII text) and/or encrypt all of the information generated by the test controls 602-614 and insert that encoded and/or encrypted information within a comment field in the web page that is returned to the tester in response to the HTTP request.

Figure 7:
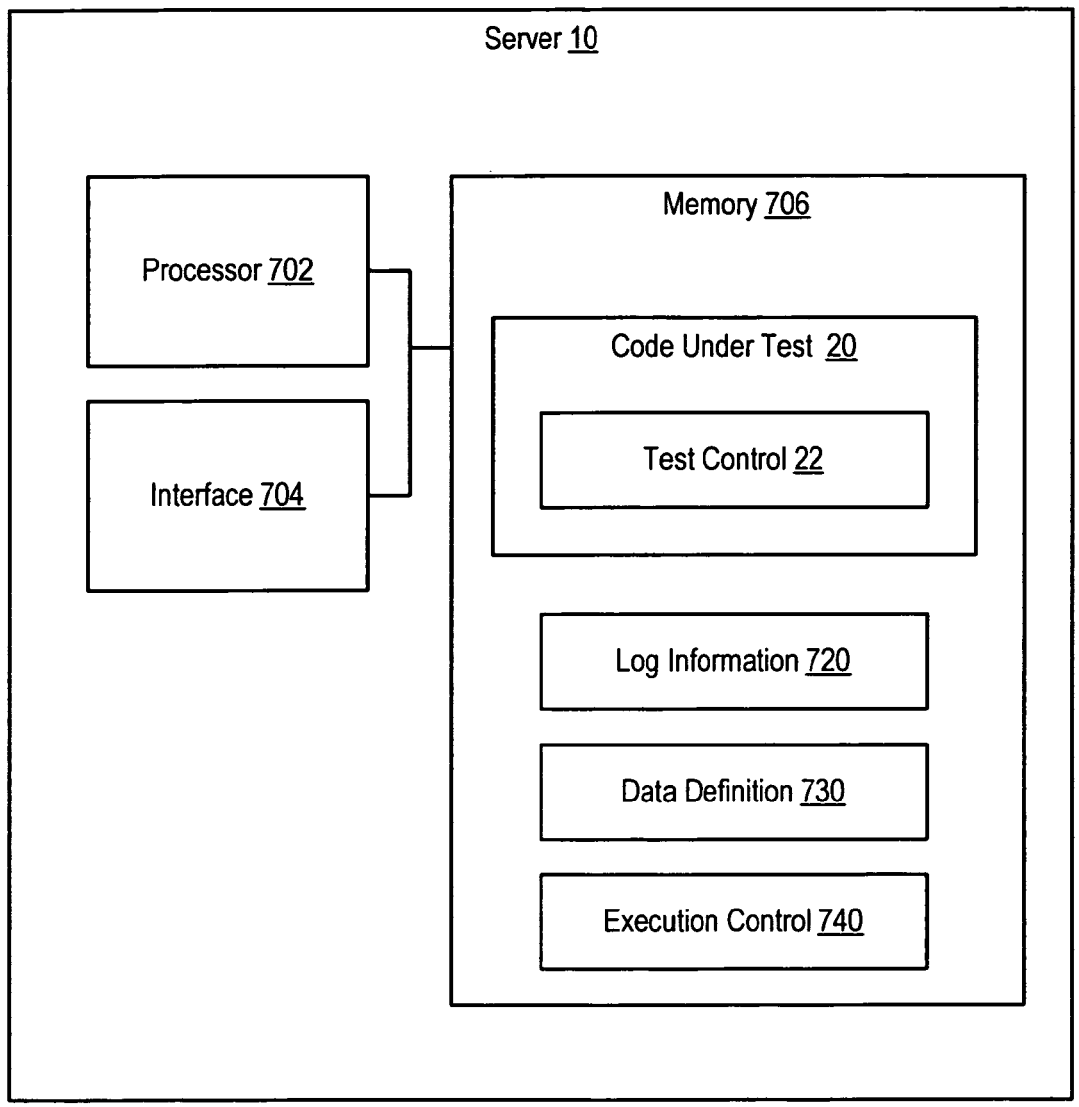
FIG. 7 is a block diagram of a server, according to one embodiment of the present invention.

FIG. 7 illustrates a block diagram of a computing device, server 10 (e.g., server 10 of FIG. 1). As illustrated, server 10 includes one or more processors 702 (e.g., microprocessors, PLDs (Programmable Logic Devices), or ASICs (Application Specific Integrated Circuits)) configured to execute program instructions stored in memory 706. Memory 706 can include various types of RAM (Random Access Memory), ROM (Read Only Memory), Flash memory, MEMS (Micro Electro-Mechanical Systems) memory, and the like. Server 10 also includes one or more interfaces 704. Processor 702, memory 706, and interface 704 are coupled to send and receive data and control signals by a bus or other interconnect.

Interface 704 can include an interface to a storage device on which the instructions and/or data included in code under test 20 are stored. Interface 704 can also include an interface to a network (e.g., network 14 of FIG. 1) for use in communicating other devices. Interface(s) 704 can also include interfaces to various peripheral Input/Output (I/O) devices.

In this example, code under test 20, which includes one or more test controls 22, is stored in memory 806. Additionally, log information 720, data definitions 730, and/or execution information 740 generated by the test controls can also be stored in memory 706 before being provided to the tester. The program instructions and data implementing code under test 20 and test control 22 can be stored on various computer readable media such as memory 706. In some embodiments, code under test 20 and test control 22 are stored on a computer readable medium such as a CD (Compact Disc), DVD (Digital Versatile Disc), hard disk, optical disk, tape device, floppy disk, and the like). In order to be executed by processor 702, the instructions and data implementing code under test 20 and test control 22 are loaded into memory 706 from the other computer readable medium. The instructions and/or data implementing code under test 20 and test control 22 can also be transferred to server 10 for storage in memory 706 via a network such as the Internet or upon a carrier medium.

Although the present invention has been described in connection with several embodiments, the invention is not intended to be limited to the specific forms set forth herein. On the contrary, the present invention is intended to cover such alternatives, modifications, and equivalents as can be reasonably included within the scope of the invention as defined by the appended claims.

What is claimed is:

1. A method comprising:
   receiving a first request, from a particular tester application executed on a particular computing device remote from a computer-readable medium storing particular code of a particular software program, to access particular code in connection with a test of the particular code, the particular code including a plurality of test controls embedded within the particular code, the plurality of test controls including at least one data recognition test control;
   determining that the first request was generated by a tester application;
   enabling each of the plurality of test controls in response to determining that the first request was generated by a tester application;
   executing the particular code in response to the first request, wherein executing the particular code in response to the first request includes locally executing at least a portion of the particular code and locally executing at least some test controls in the plurality of enabled test controls including the at least one data recognition test control; and
   sending, to the particular tester application, test result data returned through execution of the enabled test controls, wherein:
      executing the portion of the particular code causes presentation of a graphical user interface of the particular software program, the graphical user interface communicating information corresponding to data generated through the execution of the particular code,
      executing the at least one data recognition test control captures, for inclusion in the test result data, at least one particular data value in the data generated through the execution of the particular code
      and information corresponding to the particular data value is withheld from presentation in the graphical user interface.

2. The method of claim 1, wherein the plurality of test controls further includes:
   at least one execution control, wherein the execution control is configured to control progress of the test; and
   at least one log control, wherein the log control is configured to provide a log message, generated during execution of the particular code and stored in a single log file of the particular software program, to the particular tester application.

3. The method of claim 1, wherein the particular code comprises a web page.

4. The method of claim 3, wherein
   the first request is a hypertext transfer protocol request; and
   if the first request is received from the particular tester application, the hypertext transfer protocol request comprises the information identifying that the first request was generated by the particular tester application.

5. The method of claim 3, wherein the test result data is provided to the particular tester application within a comment within the web page.

6. The method of claim 1, wherein the plurality of test controls further includes at least one execution test control, executing the particular code test includes locally executing the at least one execution test control, and executing the at least one execution test control controls a conditional test execution branch defining a first execution path when a first condition is met and a second, alternate execution path when a second condition is met.

7. The method of claim 6, wherein executing the at least one execution test control includes collecting at least one execution data value describing an aspect of the conditional test execution branch.

8. The method of claim 7, wherein the at least one execution data value includes at least one of:
   a property;
   execution timing information, wherein execution timing information identifies execution timing of a component of the particular code;
   execution status information, wherein the execution status information identifies a post-execution status of the component of the particular code; and
   error information, wherein the error information comprises information associated with an error that occurs when executing the particular code.

9. The method of claim 6, wherein the execution control is configured to control the progress of the test by generating the data to include one of:
   a first status code indicating that the test should end in failure;
   a second status code indicating that the test should end in success;

information indicating that the particular tester application should change an execution path of the test.

10. The method of claim 1, wherein the at least one data recognition test control is a log test control and the at least one data value collected by executing the log test control includes a logging message generated during execution of the portion of the particular code.

11. The method of claim 1, wherein at least two of the plurality of test controls are interrelated.

12. The method of claim 11, wherein the at least two interrelated test controls act in response to a common event occurring during execution of the portion of the particular code.

13. The method of claim 1, wherein the particular code further includes an embedded integration control, the method further comprising executing the embedded integration control, wherein executing the embedded integration control:
  determines whether a request to access the particular code originates from a tester application, and
  enables each of the plurality of embedded test controls in response to determining that a request to access the particular code originates from a tester application.

14. A computing device comprising:
  a processor; and
  a memory storing particular executable code of a particular software program and program instructions, wherein the program instructions are executable by the processor to:
    receive a first request, from a particular tester application executed on a remote computing device, to access the particular code in connection with a test of the particular code, the particular code including a plurality of test controls embedded within the particular code, the plurality of test controls including at least one data recognition test control;
    enable each of the plurality of test controls in response to determining that the first request was generated by a tester application;
    initiate execution of the particular code in response to the first request, wherein executing the particular code in response to the first request includes locally executing at least a portion of the particular code and locally executing at least some test controls in the plurality of enabled test controls including the at least one data recognition test control; and
    provide, to the particular tester application, test result data returned through execution of the enabled test controls, wherein:
      executing the portion of the particular code causes presentation of a graphical user interface of the particular software program, the graphical user interface communicating information corresponding to data generated through the execution of the particular code,
      executing the at least one data recognition test control captures, for inclusion in the test result data, at least one particular data value in the data generated through the execution of the particular code
      and information corresponding to the particular data value is withheld from presentation in the graphical user interface.

15. The computing device of claim 14, wherein the plurality of test controls further includes:
  at least one execution control, wherein the execution control is configured to control progress of the test; and
  at least one log control, wherein the log control is configured to provide a log message, generated during execution of the particular code and stored in a single log file of the particular software program, to the particular tester application.

16. The computing device of claim 14, wherein the plurality of test controls includes at least one execution control, wherein the execution control is configured to control progress of the test and generate at least one execution data value, the execution data value including at least one of:
  a property;
  execution timing information, wherein execution timing information identifies execution timing of a component of the particular code;
  execution status information, wherein the execution status information identifies a post-execution status of the component of the particular code; and
  error information, wherein the error information comprises information associated with an error that occurs when executing the particular code.

17. The computing device of claim 16, wherein the execution control is configured to control the progress of the test by generating at least one execution data value for inclusion in the test result data including at least-one of:
  a first status code indicating that the test should end in failure;
  a second status code indicating that the test should end in success;
  information indicating that the particular tester application should change an execution path of the test.

18. A non-transitory computer readable medium comprising particular code of a particular software program and program instructions executable to:
  receive a first request, from a particular tester application executed on a remote computing device, to access the particular code in connection with a test of the particular code, the particular code including a plurality of test controls embedded within the particular code, the plurality of test controls including at least one data recognition test control;
  enable each of the plurality of test controls in response to determining that the first request was generated by a tester application;
  disable the test control within the code, if the request does not comprise the information identifying that the request was generated by the tester;
  initiate execution of the particular code in response to the first request, wherein executing the particular code in response to the first request includes locally executing at least a portion of the particular code and locally executing at least some test controls in the plurality of enabled test controls including the at least one data recognition test control; and
  provide, to the particular tester application, test result data returned through execution of the enabled test controls, wherein:
    executing the portion of the particular code causes presentation of a graphical user interface of the particular software program, the graphical user interface communicating information corresponding to data generated through the execution of the particular code,
    executing the at least one data recognition test control captures, for inclusion in the test result data, at least one particular data value in the data generated through the execution of the particular code,
    and information corresponding to the particular data value is withheld from presentation in the graphical user interface.

19. The computer readable medium of claim 18, wherein the plurality of test controls further includes:

at least one execution control, wherein the execution control is configured to control progress of the test; and at least one log control, wherein the log control is configured to provide a log message, generated during execution of the particular code and stored in a single log file of the particular software program, to the particular tester application.

20. The computer readable medium of claim 19, wherein the plurality of test controls includes at least one execution control, wherein the execution control is configured to control progress of the test and generate at least one execution data value, the execution data value including at least one of:

a property;

execution timing information, wherein execution timing information identifies execution timing of a component of the particular code;

execution status information, wherein the execution status information identifies a post-execution status of the component of the particular code; and error information, wherein the error information comprises information associated with an error that occurs when executing the particular code.

* * * * *